(No Model.)
J. U. TABOR.
THILL COUPLING.
No. 577,274. Patented Feb. 16, 1897.
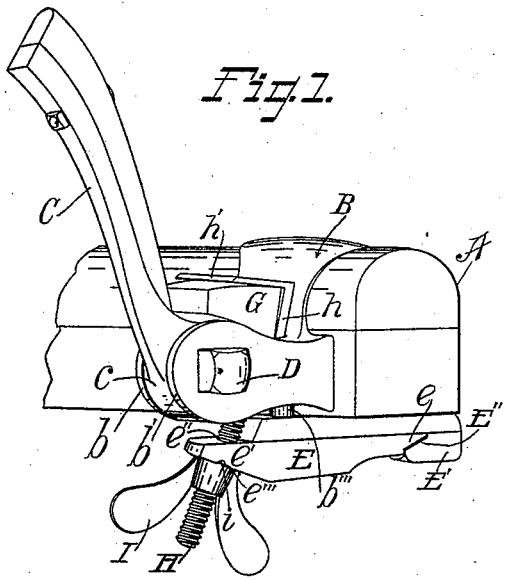
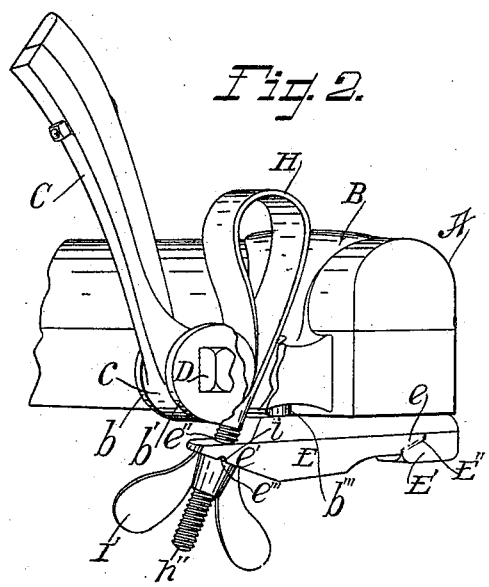
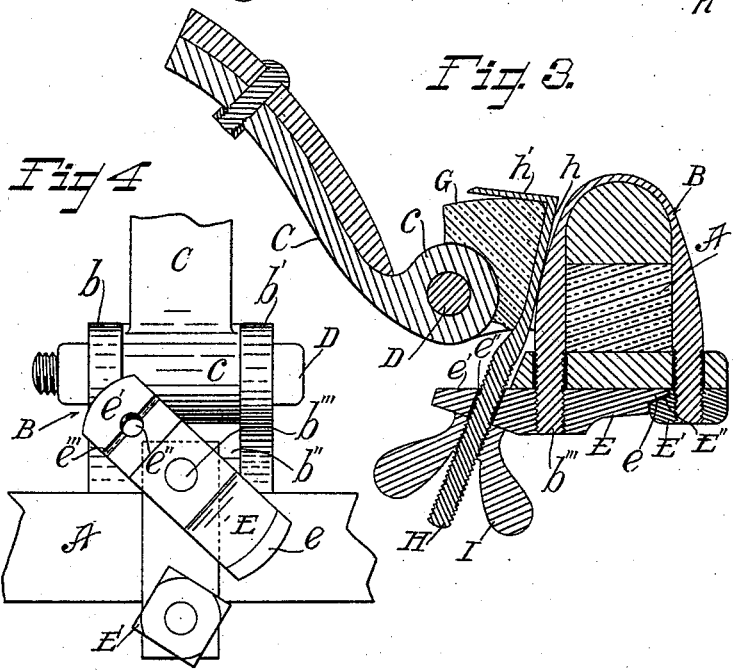
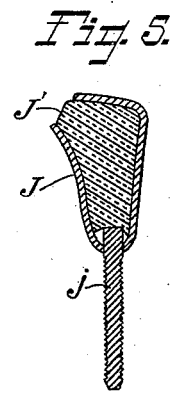
Witnesses
Perry Kingman.
Alfred S. Townsend.
Inventor
Jesse U. Tabor
by
Hazard & Townsend
his attys.

UNITED STATES PATENT OFFICE.

JESSE U. TABOR, OF LOS ANGELES, CALIFORNIA.

THILL-COUPLING.

SPECIFICATION forming part of Letters Patent No. 577,274, dated February 16, 1897.

Application filed September 4, 1896. Serial No. 604,911. (No model.)

*To all whom it may concern:*

Be it known that I, JESSE U. TABOR, a subject of the Queen of Great Britain, residing at Los Angeles, in the county of Los Angeles and State of California, have invented new and useful Improvements in Thill-Couplings, of which the following is a specification.

One object of my invention is to provide a neat, cheap, and simple antirattling device which can be quickly and conveniently applied to thill-couplings ordinarily used upon vehicles and without destroying the safety of such couplings and thereby endangering the lives of the occupants of the vehicles.

Another object of my invention is to provide a device of this kind in which the tension of the antirattler may be adjusted and so regulated as to effectually hold the shaft (or pole) of a vehicle in an elevated position when not in use, thus to do away with springs or props usually employed for this purpose.

My invention comprises the various features of construction and combinations of parts hereinafter fully set forth and claimed, whereby I accomplish the objects above set forth.

The accompanying drawings illustrate my invention.

Figure 1 is a fragmental perspective view showing one form of device embodying my invention applied to a vehicle-shaft. Fig. 2 is a like view showing another form of device embodying my invention. Fig. 3 is a sectional view of the device shown in Fig. 1. Fig. 4 is a bottom view showing the manner of locking the two nuts into their respective positions. Fig. 5 is a sectional view showing a modified form of compressible plug designed to be used in connection with the other features of my invention.

In the drawings, A represents the axle of a vehicle, and B represents the ordinary shaft-shackle clip used for securing the shafts to the vehicle. The shaft-shackle clip is provided with the customary lugs b b', projecting from the front thereof and arranged to form a socket b'' to receive the eye c of the shaft C. A bolt D pivots the eye in the socket in the ordinary manner. This much of the device is of the common and ordinary form usually employed in vehicles, and my invention is especially designed to be applied to such devices already in use, so that the expense of applying my invention to vehicles will be very slight. On account of its convenience of application to vehicles in use my device is superior to any device of this class of which I am aware. There have been many devices invented to accomplish the same purpose I accomplish by my invention, but so far as I am aware there has been invented no device having an adjustable tension and adapted to be applied to the ordinary shaft-shackle clip. After short use the tension of a nonadjustable spring becomes so relaxed that the devices are partially or wholly inoperative, and in addition thereto the ordinary rubber plug or the springs heretofore used as antirattlers are very difficult to apply. By having the tension adjustable I am enabled to so regulate the pressure as to effectually prevent any rattling of a coupling, even though the shackle-bolt be much worn. So far as I am aware no other device heretofore in use will accomplish this purpose.

In order to adapt my device for convenient attachment to shaft-shackle clips already in use upon vehicles, I adapt part of it to take the place of the two nuts usually employed to hold the yoke in position upon the clip. In practicing my invention it is necessary that a support for the tension-bolt be furnished in front of the point at which the ordinary yoke terminates, and in order to accomplish this without substituting a new yoke for the yoke already in use upon the clip I make one of the nuts E elongated or in the form of a bar, as clearly shown in the drawings, so that one end of it, e, will shoulder against and engage with the other nut, E', and lock both nuts in position upon the yoke. The other end e' of the nut E projects beyond the yoke and is provided with a bolt-hole e''. The projecting end of the nut thus forms practically a lug attached to the clip and serves the same purpose as would a yoke having this projection formed integral therewith.

There are many difficulties to be overcome in providing a yoke having an integral projection of this character, and although I do not believe that this form can be made practical, still it is to be understood that my claims cover such construction.

In order to take the strain off of the front screw-threaded portion or stem $b'''$ of the shackle-clip, I form the nut E' with an undercut E'', and I form the end $e$ of the nut E to sit beneath this undercut portion and to be thereby held firmly in position against the yoke. Thus any application of force upon the front end of the nut E will be received and borne by the nut E', and practically no strain will fall upon the front member $b'''$ of the clip.

In Figs. 1 and 3 I have shown a compressible rubber plug G, partially concaved upon one side to conform to the eye of the shaft, and have shown a bolt H, flattened at one end $h$ and arranged between the eye of the shaft and the body of the clip and having a lip $h'$, arranged to project over and engage the rubber plug. The other screw-threaded end of the bolt passes through the perforation or bolt-hole $e''$ in the nut E and a butterfly-nut I is screwed upon the end thereof. Thus when the butterfly-nut is tightened upon the bolt the lip $h'$ engages with the plug G and draws it downward, causing it to wedge tightly between the eye of the shaft and the body of the clip, giving sufficient friction to hold the shafts elevated when desired.

In Fig. 2 I have shown a flat spring H', looped at its upper portion and having the loop arranged to form a compressible plug to wedge between the eye of the shaft and the body of the clip. The lower end $h''$ of the spring is formed into a screw-threaded bolt, and a butterfly-nut I' is screwed thereupon to give the necessary tension.

In Fig. 5 I have shown a spring-metal casing J, inclosing a rubber plug J'. In the bottom of this casing a T-headed bolt $j$ is inserted, and when in use is passed through the bolt-hole or perforation $e''$ in the nut E in the same manner as the form shown in Figs. 1, 2, and 3. In this form the rubber plug supports the casing and the casing protects the plug from wear.

In order to avoid any liability of the tension-nuts working loose while in use, I provide in the bearing-face of the elongated nut E a groove $e'''$, having inclined walls, and I provide upon the bottom face of the nut I (I') a ridge $i$, which fits into the groove $e'''$, as clearly shown in Figs. 1 and 2. The tension of the compressible plug will hold the ridge firmly in the groove and when it is desired to tighten or loosen the tension by slight application of power upon the nut the ridge will easily ride out of the groove.

In practice, if it is desired to apply my invention to vehicles having the ordinary shaft-shackle clip in use thereupon, the nuts which hold the yoke in position are removed from the clips and the nuts E and E' substituted therefor. The nut E is first screwed fully home until it registers with the yoke, as shown in Figs. 1, 2, and 3. Then it is turned back into approximately the position shown in Fig. 4, and the nut E' is screwed into place until the undercut E'' is presented toward the nut E. The nut E' is turned quartering, as shown in Fig. 4, and the nut E is turned until it engages therewith and both nuts are then turned to register with the yoke and with each other, as shown in Figs. 1, 2, and 3. The nuts are thus both locked in position. Furthermore, the tension of the compressible plug will operate to prevent any loosening of the compression-nut which might possibly occur.

When the device is applied to a vehicle, the tension is so regulated by means of the butterfly-nuts that when the shafts are elevated they will be retained in their elevated position without the use of ropes or props.

My invention will also be found especially convenient in harnessing unruly or fractious horses, since the shafts may be raised into an elevated position, the horse placed in position, and the shafts lowered easily by one person, thus avoiding breaking the shafts by reason of the horse stepping thereupon, which often occurs when one person attempts alone to harness an animal. It will be readily seen that in case the tension of the compressible plug becomes weak through use it can be quickly made stronger by simply screwing the butterfly-nut upon the bolt.

Now, having described my invention, what I claim as new, and desire to secure by Letters Patent, is—

1. A thill-coupling comprising a clip provided with a socket for a shaft-eye; a shaft having its eye arranged in the socket; a bolt pivoting the eye in the socket; a yoke arranged on the clip and having one of its nuts elongated, one end being arranged to engage the other nut when fully screwed home, and its other end projecting beyond the yoke and being provided with a bolt-hole; a compressible plug arranged between the body of the clip and the shaft-eye; a bolt secured to the plug and passed through the bolt-hole in the elongated nut; and a nut screwed upon the bolt.

2. A thill-coupling comprising a clip provided with a socket for a shaft-eye; a shaft having its eye arranged in the socket; a bolt pivoting the eye in the socket; a yoke arranged on the clip; nuts, securing the yoke on the clip, one of the nuts being undercut and the other nut being elongated and having one end arranged to seat beneath the undercut nut, and having its other end projecting in front of the yoke and provided with a bolt-hole; a compressible plug arranged between the clip and the eye; a bolt arranged to compress the plug, passed through the bolt-hole in the nut, and a nut screwed upon such bolt.

3. In combination, a clip having a shaft-eye socket; a shaft-eye arranged in the socket; a bolt pivoting the shaft-eye in the socket; a yoke arranged on the clip; a lug projecting from the yoke and provided with a bolt-hole; a bolt flattened at one end and returned upon itself to form a spring-plug arranged between the shaft-eye and the clip and having its other end passed through the bolt-hole in the lug; and a nut screwed upon the bolt.

4. In combination, a clip having a shaft-eye socket; a shaft-eye arranged in the socket; a bolt pivoting the shaft-eye in the socket; a yoke arranged on the clip; nuts securing the yoke to the clip, one of such nuts being undercut, and the other nut being elongated and having one end arranged to fit beneath the undercut nut, its other end projecting in front of the yoke and provided with a bolt-hole; a bolt having one end flattened and returned upon itself to form a spring-plug arranged between the shaft-eye and the clip, and having its screw-threaded end passed through the bolt-hole in the elongated nut; and a nut screwed upon the bolt.

J. U. TABOR.

Witnesses:
ALFRED I. TOWNSEND,
JAMES R. TOWNSEND.